United States Patent [19]
Schindler et al.

[11] Patent Number: 5,908,674
[45] Date of Patent: *Jun. 1, 1999

[54] IMPACT-RESISTING GLAZING STRUCTURE

[75] Inventors: Darrel L. Schindler, Wilmington, Del.; Charles Anthony Smith, Vienna, W. Va.; Ramesh M. Gohil, Circleville, Ohio

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/572,188

[22] Filed: Dec. 13, 1995

Related U.S. Application Data

[63] Continuation of application No. 08/338,519, filed as application No. PCT/US92/04473, May 29, 1992, abandoned.

[51] Int. Cl.⁶ .......................... B32B 17/06; B32B 17/10; E06B 3/24
[52] U.S. Cl. .................. 428/34; 428/77; 428/78; 428/430; 428/480; 428/910
[58] Field of Search .................. 428/34, 38, 78, 428/77, 426, 430, 441, 437, 480, 483, 910; 52/171.3, 172, 788, 789, 790

[56] References Cited

U.S. PATENT DOCUMENTS

| | | | |
|---|---|---|---|
| 3,658,636 | 4/1972 | Beckmann et al. | 161/199 |
| 4,010,311 | 3/1977 | Lewis et al. | 428/424 |
| 4,072,779 | 2/1978 | Knox et al. | 428/220 |
| 4,109,431 | 8/1978 | Mazzoni et al. | 52/172 |
| 4,242,403 | 12/1980 | Mattimoe et al. | 428/213 |
| 4,543,283 | 9/1985 | Curtze et al. | 428/38 |
| 4,565,719 | 1/1986 | Phillips et al. | 428/34 |
| 4,710,411 | 12/1987 | Gerace et al. | 428/34 |
| 4,747,896 | 5/1988 | Anastasie | 156/85 |
| 4,952,430 | 8/1990 | Bowser et al. | 428/34 |
| 4,952,459 | 8/1990 | Thatcher | 428/426 |
| 5,049,347 | 9/1991 | Magill et al. | 264/280 |
| 5,169,694 | 12/1992 | Endo et al. | 428/34 |
| 5,256,491 | 10/1993 | Ishida et al. | 428/500 |

FOREIGN PATENT DOCUMENTS

| | | |
|---|---|---|
| 0 243 017 | 4/1986 | European Pat. Off. . |
| 0 199 233 | 10/1986 | European Pat. Off. . |
| 2 272 237 | 12/1975 | France . |
| 2474477 | 12/1995 | France . |
| 828381 | 10/1956 | United Kingdom . |
| 1537592 | 1/1979 | United Kingdom . |

OTHER PUBLICATIONS

Werner, Eberhard et al., "Polyester, Films", Encyclopedia of Polymer Science, vol. 12, pp. 193–204, 1988.

*Primary Examiner*—Vivian Chen
*Attorney, Agent, or Firm*—James T. Corle

[57] ABSTRACT

This invention comprises an impact-resisting glazing structure having a support frame and a multilayered composite secured in the frame wherein the composite comprises two sheets of glass spaced apart by an interior spacer positioned along the periphery of the glass sheets with a polyester film adhered to the interior surface of one of the glass sheets. The polyester film has an asymmetric orientation of crystals and molecules in the amorphous regions and having an in-plane distribution of crystalline and amorphous phases in which the (100) planes of said crystals lie in the film plane and wherein in the film, said crystals have chain axes oriented toward the transverse direction such that dominant physical properties are obtained in the transverse direction.

1 Claim, 5 Drawing Sheets

$\Delta n = RI - 1.6$

MODULUS (Kpsi)

TENSILE (Kpsi)

F-5 (Kpsi)

IMPACT-RESISTING GLAZING STRUCTURE

This is a continuation of application Ser. No. 08/338,519 filed Nov. 29, 1994, now abandoned, which is a national stage of PCT/US92/04473 filed May 29, 1992.

FIELD OF THE INVENTION

This invention relates to glazing structures which substantially resist penetration by objects propelled by humans or other means. In particular the structures resist penetration by storm driven objects and objects, commonly used in burglaries to gain entry, such as bricks, rocks, sticks, baseball bats, and tire irons.

BACKGROUND OF THE INVENTION

Various types of glazing structures have been developed which resist penetration by objects which are propelled against a surface of the structure. Glass laminations, commonly referred to as safety glass, consisting of a plurality of glass sheets and interlayers have been made. These structures are generally thick, heavy constructions which are not adaptable for use in usual framing applications and are expensive to fabricate. In addition, plastic sheeting, such as polycarbonate sheeting has been used. However, such sheeting is relatively costly and has limited chemical and weathering resistance. Other glass/plastic laminates are known, including insulated glazing structures. These structures suffer from the same deficiencies as noted above. Also, the insulated structures tend to fog due to condensation of moisture which enters the gas space between the glass panes. What is needed is a light weight impact resisting structure which is adaptable for use in usual framing applications which avoids the problems noted.

SUMMARY OF THE INVENTION

This invention provides a glazing structure which is inexpensive to manufacture and provides excellent impact resistance. In its simplest form the structure consists of a support frame and a glass/plastic laminate secured in the support frame. The laminate is comprised of a sheet of glass, a specially oriented polyester film and a sheet of adhesive such as polyvinyl butyral film sandwiched there between. The laminate is adhesively sealed in the support frame. In an insulating glazing embodiment the glass/plastic laminate is combined with a sheet of plain glass with the plastic sheet being on the inside of the structure. When installed, the glass/plastic side should face the direction from which an impact is expected. The interior plain glass does not provide impact resistance. It is indeed surprising that the relatively thin glass/plastic structure will withstand the onslaught of projectiles retaining security against the elements, wind and rain, as well as attacks by vandals.

DETAILED DESCRIPTION OF THE INVENTION

Figure 1:
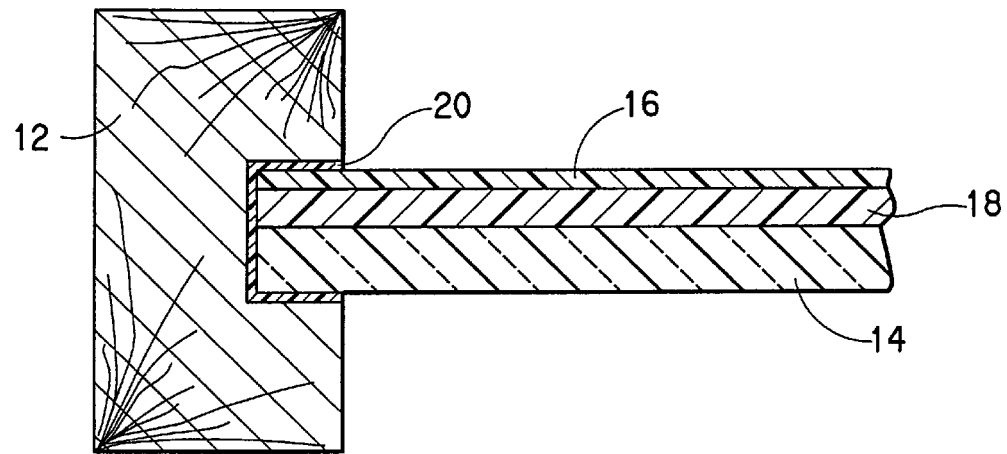
FIG. 1 is a schematic section, showing the structure of one embodiment of the glass/plastic laminate of the invention.

Referring to FIG. 1 of the drawings, an impact resistant glazing structure is comprised of support frame 12 and a multilayered laminate comprised of a sheet of glass 14, polyester film 16 which will be described with more particularity later herein and a sheet of adhesive film 18 which is sandwiched between the glass and polyester film. The laminate is secured in frame 12 by an adhesive sealant 20.

Glass sheet 14 is positioned in a direction likely to receive an impact. Surprisingly, the thickness of the glass does not materially influence the impact resistant character of the structure. The glass may be tempered or untempered. Tempered glass is preferred for some applications. Thicknesses of the glass may vary from 2 mm to 12 mm, the major consideration being to keep the thickness to a dimension which can be accommodated in a standard glazing frame.

Figure 2:
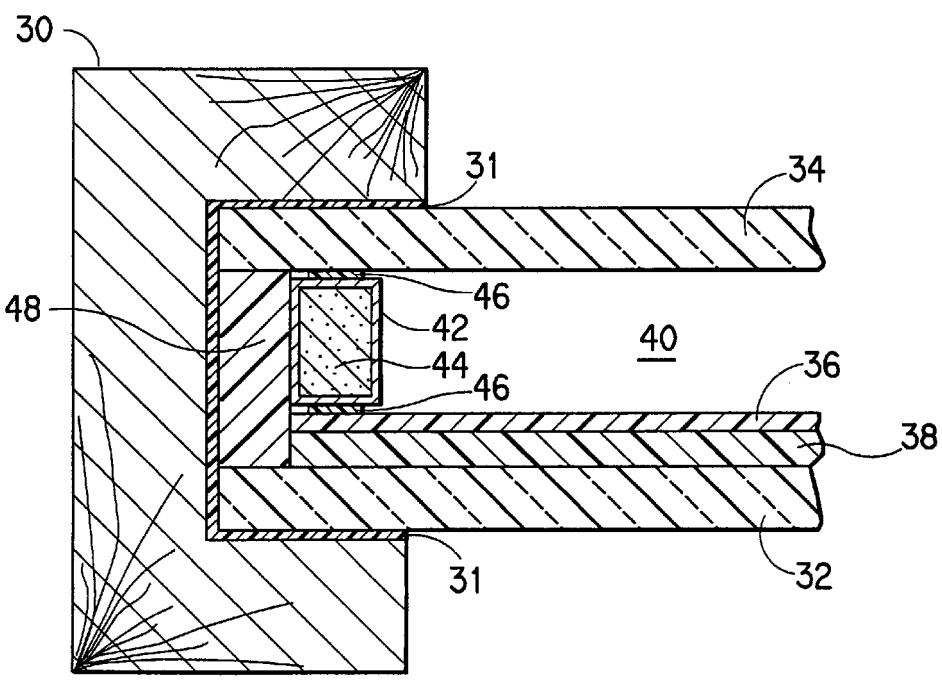
FIG. 2 and FIG. 2A are schematic sections showing insulated glazing embodiments of the invention.

In another embodiment shown in FIG. 2, an insulated glazing structure is provided by sealing in a frame 30 two glass sheets 32 and 34. Sealant 31 assists in securing the glass in frame 30. Polyester film 36 is laminated to glass sheet 32 using adhesive film 38. A gas space 40 about 5/8 in (15.875 mm) wide separates the two sheets of glass. An aluminum spacer 42 containing a dessicant 44 separates the glass sheets. A sealant 46 provides a moisture barrier around the glass sheets. There are small holes in the spacer leading into gas space 40. These holes allow moisture which is sealed inside the unit during its manufacture to become absorbed by the dessicant, trapping it so that it does not condense and fog the glass. Sealing member 48 extends around the periphery of the structure providing an air-tight seal for the space between the sheets of glass. Slight imperfections or rupture of sealing member 48 tend to permit wicking of moisture in to gas space 40.

Figure 2A:
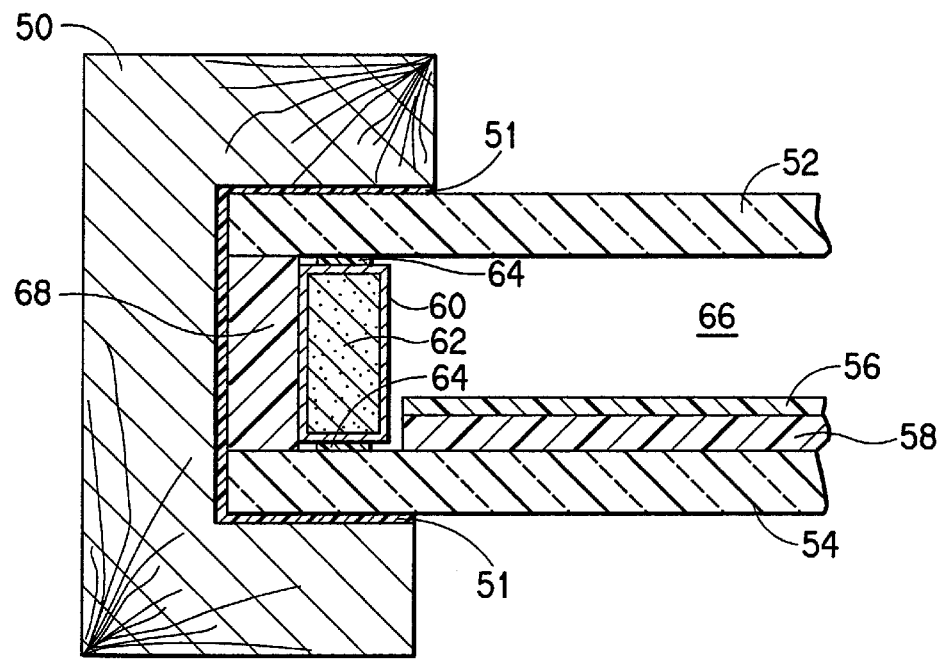

In a preferred embodiment of this invention shown in FIG. 2A, an insulated glazing composite comprising two glass sheets 52 and 54 are secured in support frame 50. The glass sheets are spaced apart and sheet 54 has on its interior surface a polyester film 56 adhered to the interior surface of the glass by a sheet of adhesive film 58. An aluminum spacer 60 containing a dessicant 62 separates the glass sheets. A sealant 64 provides a moisture barrier around the glass sheets. There are small holes in the spacer leading into gas space 66. These holes allow moisture which is sealed inside the unit during its manufacture to become absorbed by the dessicant, trapping it so that it does not condense and fog the glass. The glazing structure has a sealing member 68 around its periphery to maintain an air-tight space between the sheets of glass. The polyester film 56 and adhesive sheet 58 approach but do not contact the sealing member. The insulated structure is sealed in frame 50 using a sealant 51. Quite surprisingly, spacing the polyester film 56 and adhesive sheet 58 from the sealing member 68 and spacer 60 does not significantly affect the impact resistance of the structure. It is also surprising that this embodiment alleviates the problem of moisture being wicked into the air-tight space 66 between the sheets of glass. Although it is usual to place a dessicant in the space between the sheets of glass, with the influx of moisture the dessicant soon becomes moisture laden and ineffective.

The polyvinyl butyral adhesive sheeting may be selected from the many commercially available grades of plasticized polyvinyl butyral. A particularly desirable product of the type disclosed in Moynihan, U.S. Pat. No. 4,292,372 is sold by E. I. du Pont de Nemours & Co. under the trademark Butacite®. The polyvinyl butyral film should have a thickness from 10 to 60 mils (0.25 mm to 1.52 mm). Other adhesive sheeting materials such as polyurethanes and the like may be substituted for the polyvinyl butyral film.

Polyester film which is asymmetrically oriented is generally described in Knox, U.S. Pat. No. 4,072,779; however, Knox provides no teaching of the special requirements for the polyester film useful in this invention. The polyester film useful in this invention is asymmetrically oriented preferentially in the transverse direction (TD) and heat set. In-plane orientations of crystallites and amorphous molecules and attendant properties provided thereby are very important for impact resistance of the glass laminates of this invention. Transverse direction (TD) and machine direction (MD) as used herein refer to the direction of travel of the polyester web during its manufacture. The polyester film should have a thickness from 4 to 14 mils (0.10 mm to 0.36 mm). The outer surface of the polyester film may be coated with an abrasion resistant material as disclosed in Knox.

The polyester film useful in this invention should have a special in-plane distribution of crystalline and amorphous phases. All (100) planes of the polyester crystals should lie in the film plane and crystals with molecular or chain axes are oriented toward the TD. In addition molecules in the amorphous region are oriented preferentially in the TD. The overall orientation of both the crystalline and amorphous phases as measured by refractive index is higher along the TD. Distribution of the orientation of the crystalline and amorphous orientations can vary, as measured by refractive index, fluorescence spectroscopy and wide angle x-ray pole figure analysis, by up to 20% of the values shown in FIGS. 3–11 and still provide a film which when incorporated in the laminated structure of this invention gives excellent impact resistance.

Figure 3:
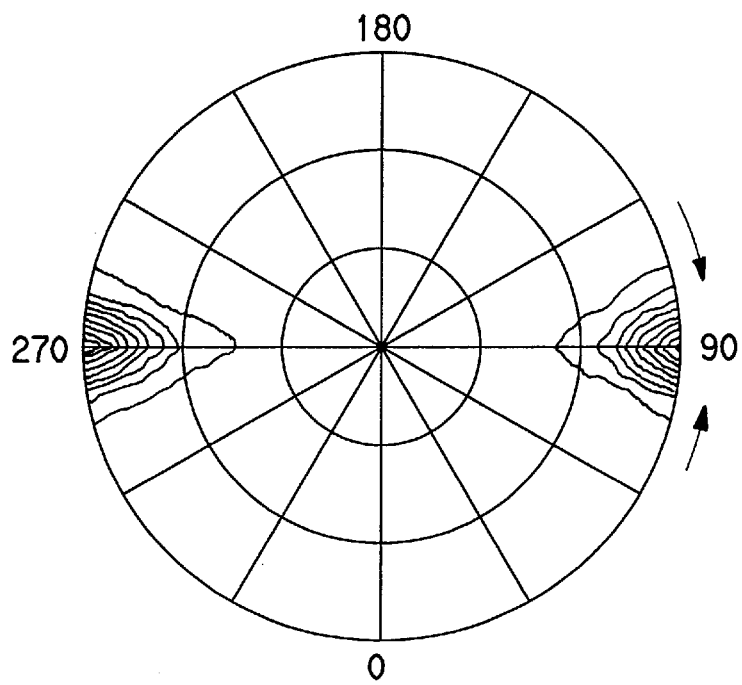
Figure 4:
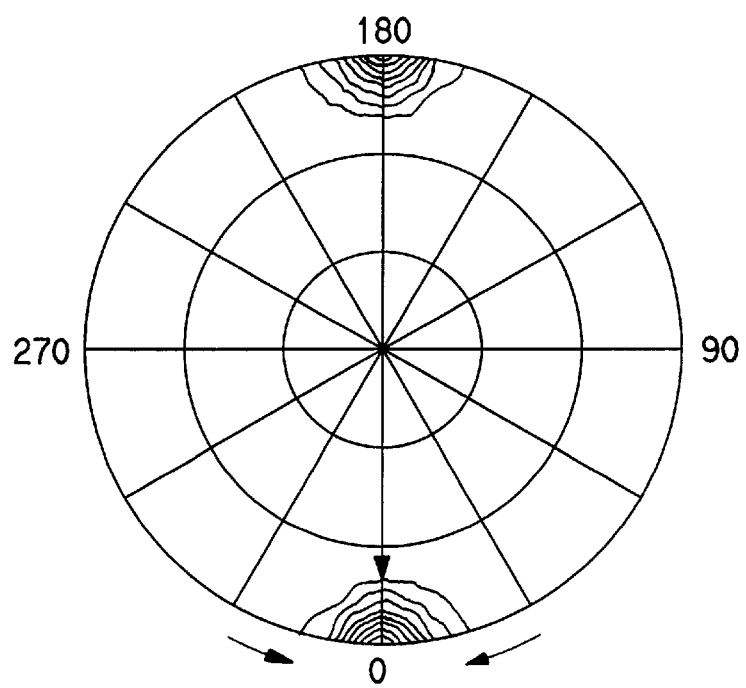

FIGS. 3 and 4 show crystalline orientation for polyethylene terephthalate films useful in this invention. Referring to FIG. 3, wide angle x-ray pole figure analysis of a polyethylene terephthalate film from (°105) planes shows an absence of any intensity in the center of the pole figure which indicates an absence of machine direction (MD) oriented crystals in the film It shows that crystals with molecular chain axes are oriented toward the TD. At a particular TD draw ratio properties along the MD and TD become the same in the film plane. This is defined as "balanced properties" and the particular TD draw ratio as the "balance point". The film is preferentially, i.e., "over-oriented", along the TD after achieving the "balanced point."

The film is highly uniplanar. This is determined from the benzene ring orientation which lies in the (100) planes. As shown in FIG. 4, the angle (phi) describing the intensity arising from the (100) planes is about 15°.

Figure 5:
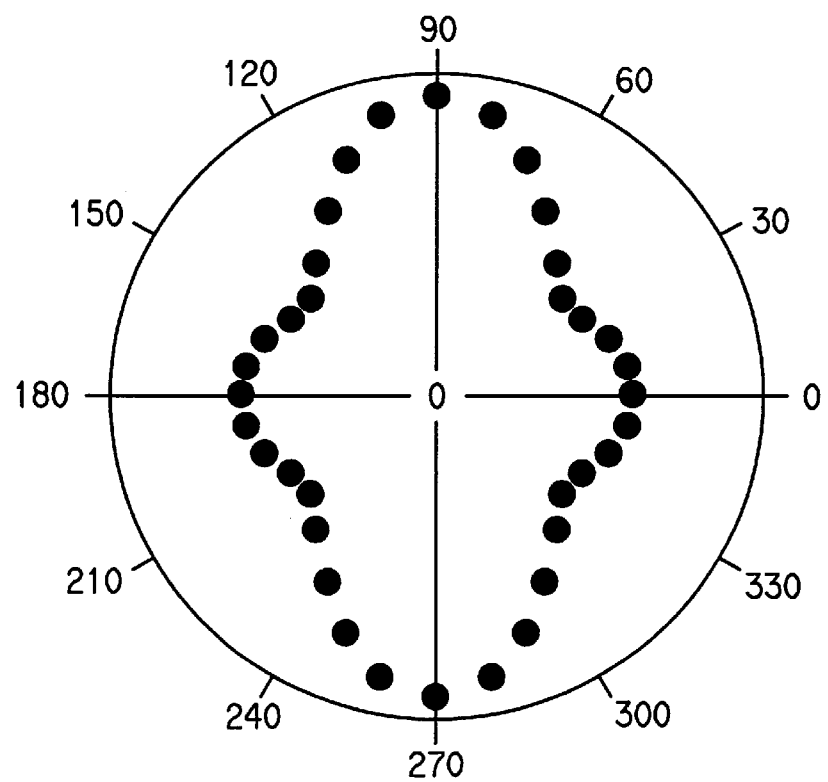
FIGS. 3–9 show graphic depictions of properties of a polyester film useful in the invention.
Figure 6:
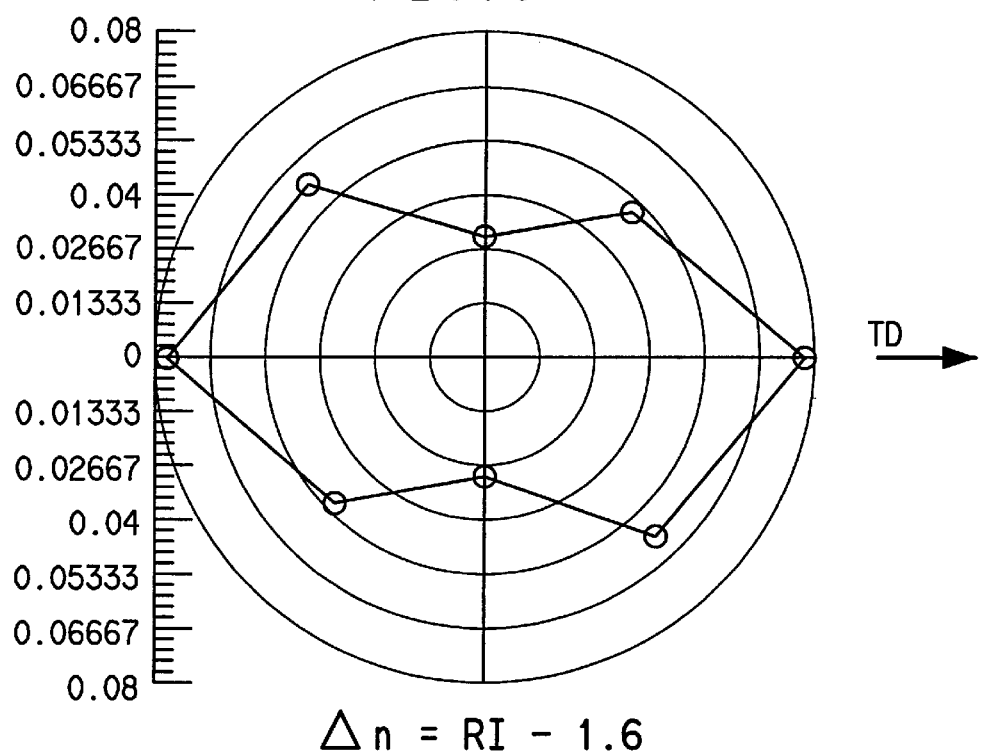

FIG. 5 is a polar plot showing the amorphous orientation of molecules in the amorphous phase of the film as determined from the stain intrinsic fluorescence spectroscopy at 390 nm. The distribution of intensity arising from the intrinsic fluorescence shows that the amorphous orientation at different angles in the film plane is larger along the TD. As shown in FIG. 6 the overall molecular orientation (in crystalline and amorphous planes) is also dominant along the TD.

Figure 7:
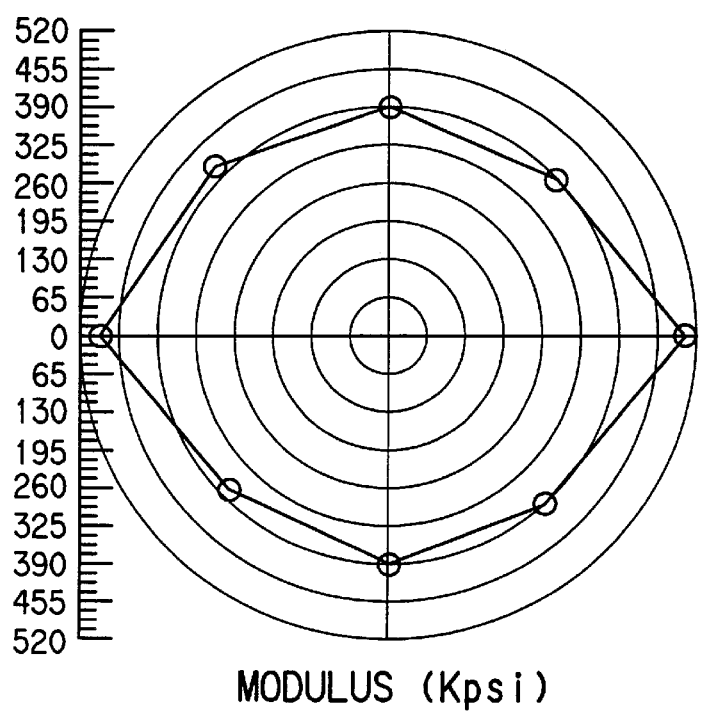
Figure 8:
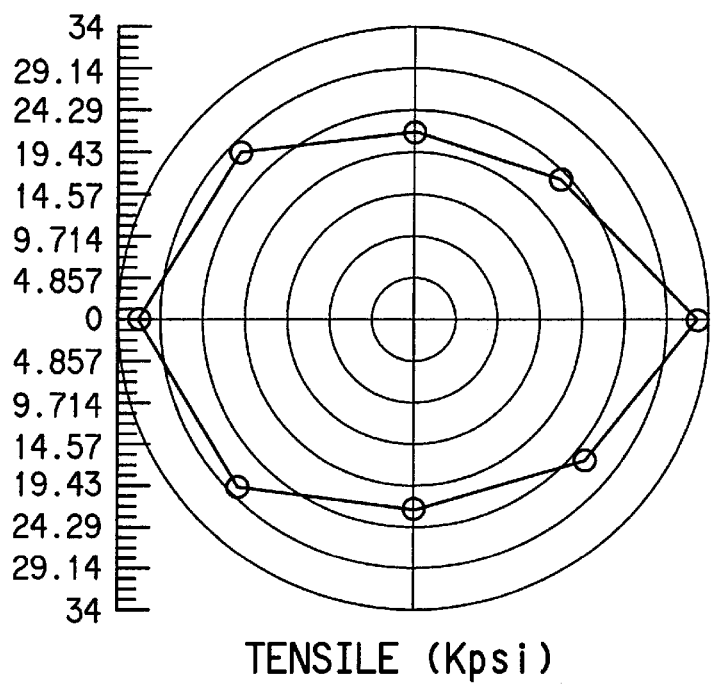
Figure 9:
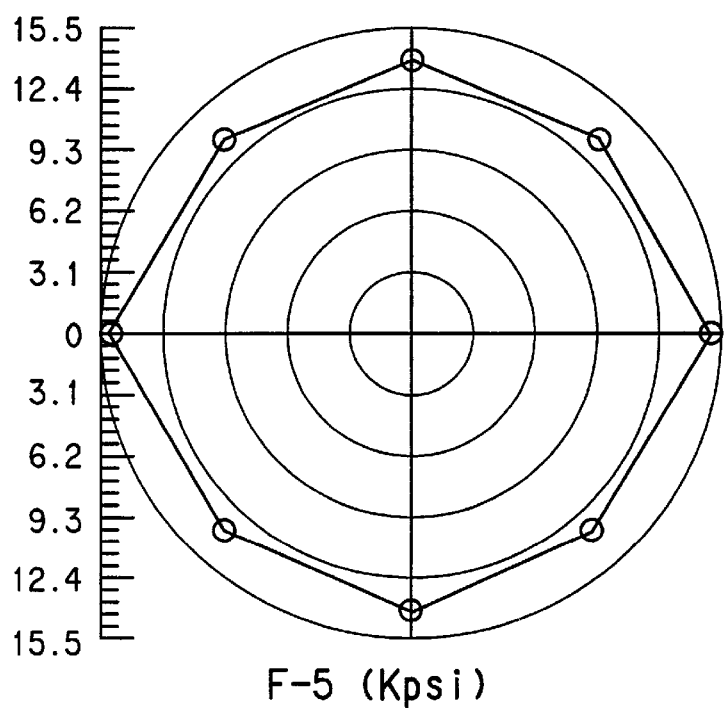

FIGS. 7–9 are polar plots showing the distribution of mechanical properties such as tensile modulus, tensile strength and F-5 (stress at 5% strain in the stress-strain curve) at different angles in the film plane due to the different molecular orientation described above. In all cases the mechanical properties are dominant along the TD.

The polyester film may be prepared by extruding molten polymer onto a cool quench roll to form an amorphous film using the method and apparatus described in U.S. Pat. No. 3,223,757. The amorphous film is stretched at an elevated temperature first in the MD, and it is then stretched a greater amount in the TD. Stretching may be carried out simultaneously is the TD and MD so long as the film is preferentially asymmetrically oriented to provide dominant physical properties in the TD.

The present invention has been described and exemplified with particular reference to the use of polyethylene terephthalate film, however, it is to be understood that the invention comprehends using any similar preferentially asymmetrically oriented polyester films, copolyesters such as copolymers of polyethylene terephthalate and polyethylene isophthalate, as well as other polyesters such as polyethylene naphthalate. In addition the polyester film may be coated, for example with a reflective coating for solar heat control, and the film can be tinted and/or printed for aesthetic and/or commercial advertising purposes.

In preparing the glazing structures of this invention the polyester film is bonded to the glass using an adhesive such as polyvinyl butyral by applying heat and pressure to the structure. An abrasion resistant material may be applied to the polyester outer surface and the combined structure cured at temperatures from about 130 to 150° C. for 7 to 180 minutes. The resulting bonded structure is optically clear. Insulated glazing structures may be prepared using the glass/plastic laminate of this invention assembled using known components by known methods.

Care must be taken to securely anchor the glazing in the framing member which may be selected from known materials such as wood, plastics such as polyvinyl chloride, aluminum and steel. It has been found that an overlap of from about ⅜ to ¾ in.(0.95 to 1.9 mm) at each edge of the glazing is needed to retain the glass laminate securely in the frame. The glazing is sealed in the frame using known sealants such as room temperature vulcanizing (RTV) silicon sealants and the like.

The invention will be further illustrated by the following examples.

EXAMPLES

EXAMPLE 1

A series of 12 sq ft (1.1 sq m) windows 3 ft×4 ft.(0.9×1.2 m) using wood framing were constructed using as glazing the following materials:

(1) 5 mm thick annealed glass, (2) 5 mm thick tempered glass, (3) 5 mm thick annealed glass surfaced with commercial polyethylene terephthalate film (PET) 3 mils (0.0762 mm) thick using a pressure sensitive acrylic adhesive (PSA) to adhere the film to the glass, (4) 2 plies of 5 mm thick annealed glass laminated together with a 30 mil (0.76 mm) polyvinylbutyral film (PVB) interlayer (a typical safety glass construction), and (5) 5 mm thick annealed glass with a laminated plastic composite of 30 mils (0.76 mm) of polyvinyl butryal film and 7 mils (0.178 mm) of polyethylene terephthalate film.

The PET film was prepared by stretching an amorphous film in the MD 3.4× at a temperature of 90–95° C. and in the ID 3.8× at temperature of 105–110° C. The stretched film was heat set at 200–205° C. and heat relaxed under reduced tension to give a MD shrinkage of about 0.8% at 150° C.

The series of structures were subjected to a test which consisted of simulating 100 mph wind velocity, by pulling a vacuum behind the window, and then pitching five standard baseballs weighing 0.32 lb.(145.15 gms) at the window at 85 mph using a commercially available baseball pitching machine. The test was designed to be reproducible and severe and could represent objects that are either propelled by vandals or by a wind storm.

Care was taken to adequately secure the glazing in the framing members. Frames were designed so that at least ¾ in. (19 mm) of each edge of the glazing was covered by the framing members, and the glazing was secured in the framing members using RTV silicon sealant.

The results obtained are summarized in Table 1 which follows:

TABLE 1

| Sample | Results No. of baseball hits necessary to penetrate the glass/plastic laminate |
| --- | --- |
| (1) Annealed glass | Massive failure 1st hit* |
| (2) Tempered glass | Massive failure 2nd hit* |
| (3) Annealed glass protected with PPT 3 mils (0.0762 mm) adhered with acrylic adhesive | Failure-Penetrated 1st hit* |
| (4) Liminated safety glass | Failure-Penetrated 5th hit* |
| (5) Glass laminated with PET/PVB plastic composite | No penetration from all 5 hits |

(*Vacuum was lost after the window was penetrated.)

The only window which would have prevented entry of water or wind after the test was No. (5), the glazing structure of this invention. In all tests the glass was cracked.

EXAMPLE 2

A series of tests was conducted to illustrate the penetration resistance of glazing structures against onslaughts typically encounter in "smash and grab" burglaries.

Twelve square foot (1.12 sq m) windows of the type described in Example 1 were assembled using (1) 5 mm thick annealed glass, (2) 5 mm thick tempered glass, and (3) 5 mm thick annealed glass with a laminated plastic composite consisting of 30 mils (0.76 mm) of PVB and 7 mils (0.178 mm) PET film described in Example 1.

A man weighing 200 lbs. (90.72 kg) then tested the penetration resistance of the windows by attacking them with a 3 ft (0.9 m) long piece of 2 ft×4 ft (0.6 m×1.22 m) lumber. In the case of both the annealed and tempered glass, massive failure occurred within seconds of the attack. In the case of the glass/plastic composite of this invention, the window was battered until the attacker ran out of energy. Although small holes approximately 1 in×2 inches (25.4 mm×50.8 mm) were punched through the glass/plastic composite, no hole was large enough to permit extending a hand or arm through the opening.

We claim:

1. An insulated impact-resisting glazing structure comprised of a support frame and a multilayered composite secured in said support frame, said composite comprising two sheets of glass spaced apart by an interior spacer positioned along the periphery of the sheets of glass to provide a gas space therebetween, one of said sheet of glass having on an interior surface adjacent the gas space a polyester film having a plurality of amorphous regions containing amorphous molecules and a plurality of crystalline regions containing crystals and adhered to said surface by a sheet of adhesive film, said composite having a sealing member positioned around its periphery to maintain an air-tight space between said sheets of glass, said polyester film and said adhesive film approaching but spaced from said spacer whereby the glazing structure is resistant to moisture wicking, said polyester film having an asymmetric orientation of crystals and molecules in the amorphous regions and having an in-plane distribution of crystalline and amorphous phases in which (100) planes of said crystals lie in the film plane and wherein in the film, said crystals have chain axes oriented toward the transverse direction such that dominant physical properties are obtained in the transverse direction.

* * * * *